United States Patent [19]

Kuroiwa et al.

[11] Patent Number: 5,555,771
[45] Date of Patent: Sep. 17, 1996

[54] FIXING STRUCTURE FOR MOUNTING MEMBER OF A NUT

[76] Inventors: Daisuke Kuroiwa, 129, Toriba-machi; Shigeharu Kobayashi, 132-1, Toriba-machi; Mitsuji Kanai, 1424-2, Aramaki-machi, all of Maebashi-shi, Gunma-ken, Japan

[21] Appl. No.: 183,345

[22] Filed: Jan. 19, 1994

[30] Foreign Application Priority Data

Jan. 20, 1993 [JP] Japan .................... 5-007731

[51] Int. Cl.⁶ ........................... F16H 25/22
[52] U.S. Cl. .................... 74/459; 74/424.8 NA; 277/189; 403/289; 411/438; 411/508; 411/913
[58] Field of Search ............. 74/459, 441, 424.8 NA, 74/424.8 R, 89.15; 277/188 R, 188 A, 189; 403/362, 289, 337; 411/514, 513, 508, 509, 913, 182, 178, 438

[56] References Cited

U.S. PATENT DOCUMENTS

| | | | |
|---|---|---|---|
| 3,678,776 | 7/1972 | Patterson | 74/459 |
| 4,484,783 | 11/1984 | Emmerich | 411/508 |
| 4,529,332 | 7/1985 | Glabiszewski | 403/362 |
| 4,749,318 | 6/1988 | Bredal | 411/508 |
| 4,841,796 | 6/1989 | Teramachi | 74/459 |
| 5,101,213 | 3/1992 | Harada et al. | 411/438 |
| 5,253,948 | 10/1993 | Butler | 403/289 |

*Primary Examiner*—Charles A. Marmor
*Assistant Examiner*—David Fenstermacher

[57] ABSTRACT

At least one end portion of a nut threadably engaged with a screw shaft is provided a mounting member mounting stepped portion, a radial through-hole is formed in the peripheral surface of the stepped portion and a radial pin insertion aperture is formed in the peripheral surface of a mounting member correspondingly to the through-hole, and an engagement recess is formed at a location whereat the through-hole and the pin insertion aperture are connected together. A pin member is provided with a protruded portion on the barrel portion thereof. The pin member is elastically deformed and inserted into the through-hole, and the tip end thereof is brought into engagement with the pin insertion aperture to fix the mounting member and bring the protruded portion into engagement with the engagement recess, thereby preventing the pin member from slipping out.

7 Claims, 8 Drawing Sheets

FIXING STRUCTURE FOR MOUNTING MEMBER OF A NUT

BACKGROUND OF THE INVENTION

1. Field of the Invention

This invention relates to a fixing structure for a mounting member such as a dustproof seal mounted on a nut for a ball screw or the like.

2. Related Background Art

For example, in the case of a ball screw often used in a machine tool, if during operation, foreign substances such as cutting scraps and cutting oil adhere to the screw shaft and come into a nut, the wear of balls or a spiral groove surface which is the rolling surface of the balls may abnormally increase or the ball screw may become bad in operation to thereby reduce the service life of the ball screw, and further may result in damage to the ball screw. To prevent this, it is usually practiced to fixedly mount a dustproof seal on a ball screw nut.

Figure 15:
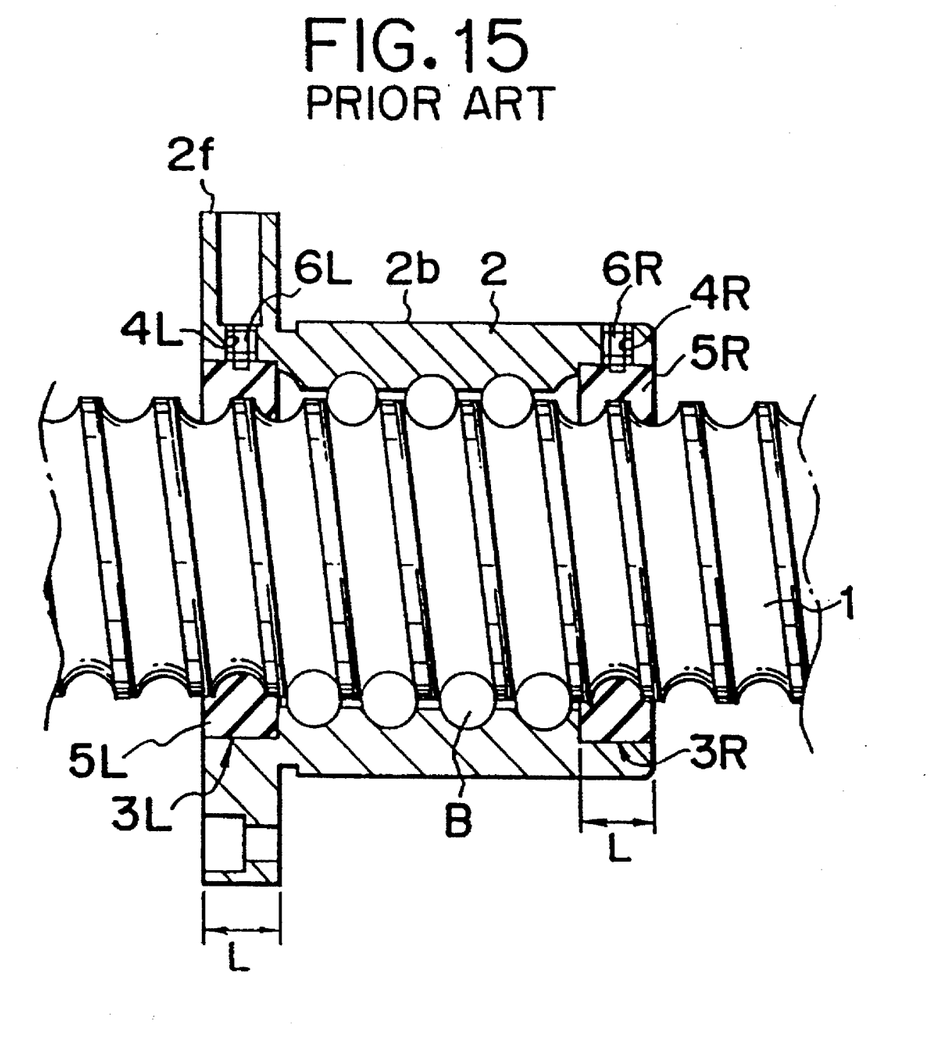
FIG. 15 is a longitudinal cross-sectional view showing a seal fixing structure for a ball screw nut according to the prior art.

As a prior-art fixing structure for a seal to a ball screw nut, there is known one as shown, for example, in FIG. 15 now to be described. To facilitate understanding, suffixes "R" and "L" have been used in the reference numbers to denote (R)ight-hand and (L)eft-hand portions of the assembly. This structure has seal mounting stepped portions 3L and 3R of a large diameter on the left and right end portions of a ball screw nut 2 screwed onto a ball screw shaft 1 through balls B, and threaded holes 4R and 4L are formed in the circumferential surfaces of the stepped portions 3R and 3L. That is, there is formed one or two radial threaded holes 4R, 4L extending from the right portion of the outer peripheral surface 2b of the ball screw nut 2 and the flanged peripheral surface 2f of the ball screw nut 2 to the respective stepped portions 3R and 3L. The depth (width) of the stepped portions is made equal to the width L of the corresponding seals 5, and seals R and 5L are fitted to the stepped portions 3R and 3L, respectively, whereafter set screws 6R and 6L threadably engaged with the threaded holes 4R and 4L, respectively, are fastened, whereby the seals 5R and 5L are fixed in the circumferential direction and the axial direction.

In the prior-art fixing structure for the seal to the nut shown in FIG. 15, the seals 5R and 5L are fixed by the set screws 6R and 6L threadably engaged with the threaded holes 4R and 4L and therefore, it is necessary to form the threaded holes 4R and 4L in the ball screw nut 2. Thus, working processes such as tap prepared hole formation and tapping work are required. Further, to ensure the seals 5R and 5L are to be fixed reliably, when threaded holes are formed at two locations in the circumferential direction, there has been a problem that more time and labor are required for working and it is difficult to improve productivity.

SUMMARY OF THE INVENTION

The present invention has been made in view of the above-noted problem peculiar to the prior art and has as an object to provide a fixing structure for the mounting member of a nut which structure does not require threaded hole formation taking much time and labor as in the prior art, which and is simple in the working of the nut and readily enables the nut to be mounted, and which dismounted and is provided with a good fixing function.

According to the present invention, a mounting member is fitted onto a stepped portion of a large diameter for mounting the mounting member which stepped portion is provided on the end portion of a nut, and the mounting member is fixed in the circumferential direction and the axial direction by a pin member. The pin member is inserted into a through-hole extending from the outer diameter side of the nut to the peripheral surface of said stepped portion, and the tip end portion of the pin member comes into engagement with a radial aperture formed in the side of the mounting member to thereby fix the mounting member. At the same time, the intermediate projection of the pin member comes into engagement with a recess for engagement, whereby the pin member is prevented from slipping out. Thereby, the pin member is prevented from slipping off even when it is subjected to vibration or shock.

The machining for fixing the mounting member to the nut need only be done so as to provide, for one mounting member, at least one radial hole extending through the mounting stepped portion thereof and an engagement portion for engagement with the protruded portion of the pin member. Moreover, the working of the engagement portion can be done, for example, during the working of the stepped portion for mounting the mounting member and therefore, the working is simple and presents little or no burden in the production of nuts.

Also, the tapping of screw threads as in the fixing system by set screws is unnecessary and the working time is greatly shortened. As a result, a great improvement in productivity can be achieved.

DESCRIPTION OF THE PREFERRED EMBODIMENTS

Some embodiments of the present invention will hereinafter be described with reference to the drawings in which portions identical or corresponding to those in the above-described example of the prior art are given the same reference characters and need not be described.

Figure 1:
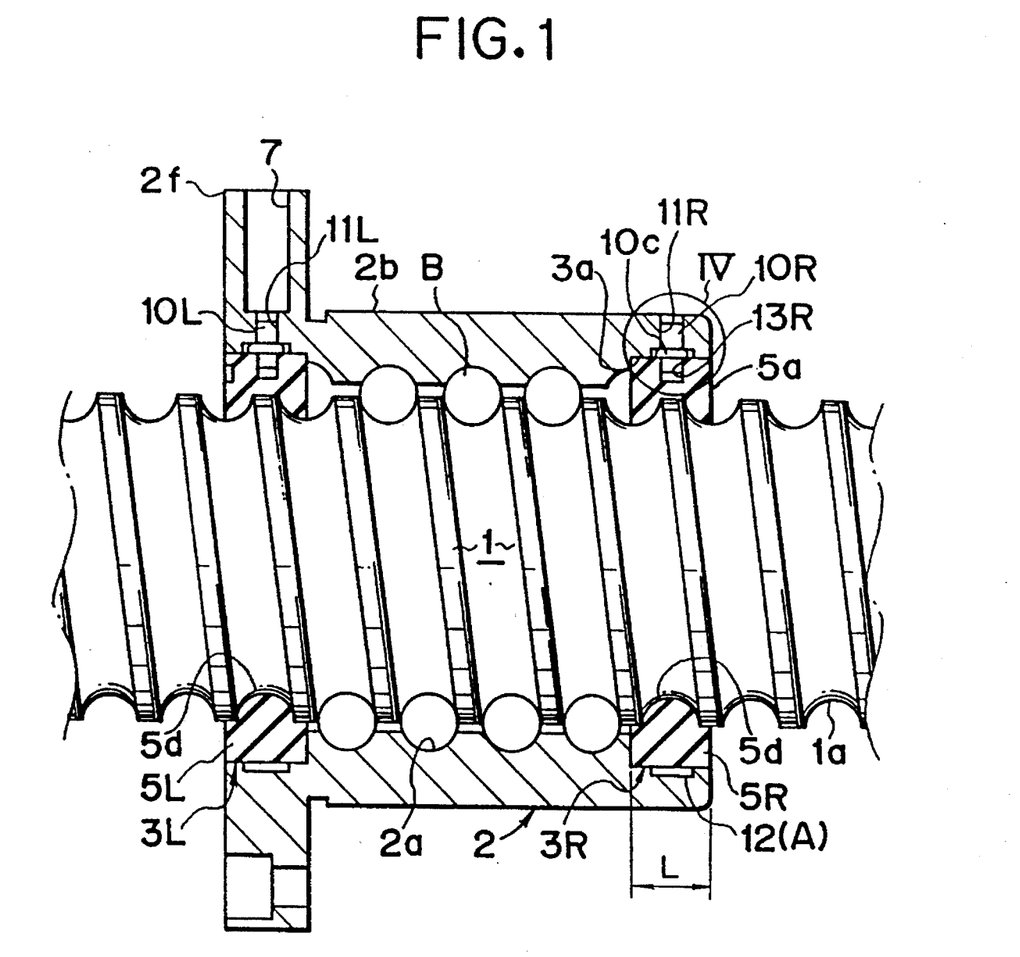
FIG. 1 is a longitudinal cross-sectional view of an embodiment of the present invention.

Referring to FIG. 1 which is a longitudinal cross-sectional view of an embodiment of the present invention, a ball screw shaft (hereinafter referred to as the "screw shaft") 1 having a thread groove 1a of semicircular cross-sectional shape (or Gothic arc shape) on the outer peripheral surface thereof is threadably engaged with a ball screw nut (hereinafter referred to as the "nut") 2. A thread groove 2a of semicircular cross-sectional shape (or Gothic arc shape) opposed to the thread groove 1a of the screw shaft 1 is formed on the bore surface of the nut 2. A number of steel balls (hereinafter referred to as the "balls") B are disposed for rolling movement between the thread grooves 1a and 2a opposed to each other.

A ball circulating tube (not shown) turned around the thread grooves 1a, 2a by two and half times and thereafter obliquely astride thereon to circulate the balls is mounted on the nut 2. The tube is mounted so that when, during the relative spiral motion of the screw shaft 1 and the nut, the balls B rotate about the screw shaft 1 two and half times while rolling along the thread grooves 1a, 2a, they may repeat circulating motion of being scooped up by the tip end of the ball circulating tube and passing through the interior of the tube and returning to the original locations in the thread grooves 1a, 2a. The circulating system for the balls B is not limited to the above-described tube type, but may be of the deflector type or the end cap type.

Ring-shaped dustproof seals ( hereinafter referred to as the "seals") 5R and 5L for the ball screw for sealing the screw shaft 1 are axially mounted on the opposite end portions of the nut 2, and are fixed in the axial direction and the circumferential direction by radially inserted pin members 10. Spiral convex ridges 5d are provided on the inner peripheral surfaces of the seals 5 and are slidably engaged with the spiral groove 1a of the ball screw shaft 1.

The details of the fixing structure for the right seal 5R in FIG. 1 will hereinafter be described.

On the right end portion of the nut 2, a seal mounting stepped portion 3R having a diameter larger than the inner diameter thereof and having a depth substantially equal to the width dimension L of the seal 5R is provided so as to open in the right end portion of the nut 2. Also, a radial through-hole 11R communicating from the outer surface 2b of the nut to the inner surface 3a of the seal mounting stepped portion 3R is formed in the stepped portion 3R.

Figure 4:
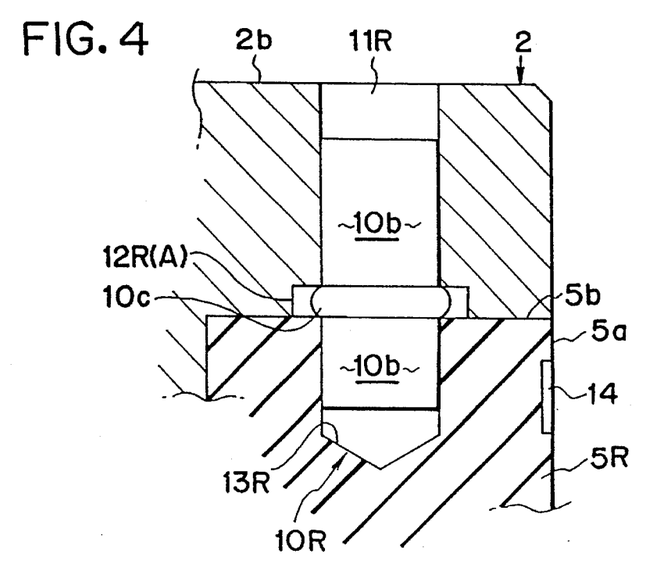
FIG. 4 is an enlarged view of the portion IV of FIG. 1.

The inner surface 3a of the seal mounting stepped portion 3 provides a mating or engaging surface for the seal 5R, and an annular escape groove 2R is formed there. As shown in FIG. 4, this escape groove 12R serves also as an engagement recess A engaged by the protruded portion 10c of a pin member 0 which will be described later, and is formed simultaneously with the inner surface 3a.

On the other hand, a radial pin insertion aperture 13R is formed in the outer peripheral surface of the seal 5R. This pin insertion aperture 13R is formed to in align with a through-hole 11 formed in the seal mounting stepped portion 3 and is adapted to receive the tip end portion of the pin member 10 therein. Also, a concave (or convex) aperture position mark 14 is formed on the outer (right) end surface 5a of the seal 5R to indicate the position of the pin insertion aperture 13.

Figure 2:
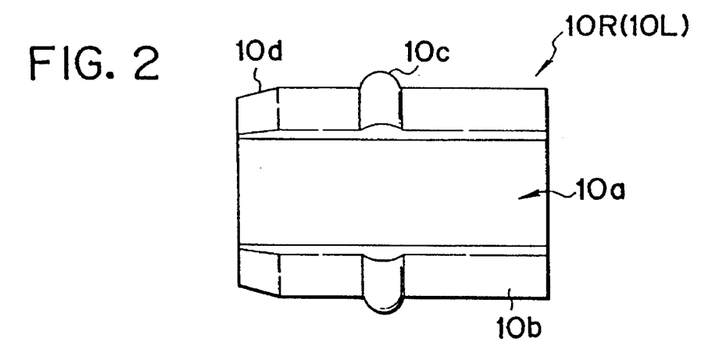
FIG. 2 is a front view of an embodiment of the pin member of the present invention.
Figure 3:
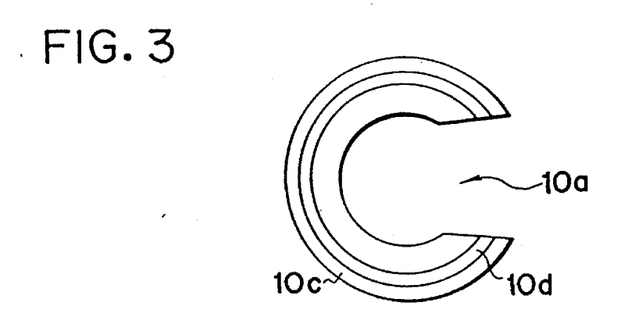
FIG. 3 is an end view of the pin member of FIG. 2.

The details of the pin member 10R are shown in FIGS. 2 and 3.

This pin member 10R is formed by molding a synthetic resin material, and is a spring pin of C-cross-sectional shape axially having a slot 10a. On the lengthwise intermediate portion of the pin barrel portion 10b of the pin member, there is formed a slip preventing convex portion 10c bulged diametrically outwardly thereof. Also, the tip end of the pin insertion side is made into a tapered surface 10d to facilitate the insertion of the pin member into the through-hole 11R and the pin insertion aperture 13R.

The above-described fixing structure is substantially the same also in the left end portion of the nut 2. However, from the viewpoint of working, in the flange portion 2f of the left end, a large-diametered counterbore 7 is formed deeply in the radial direction from the side of the flange, and then the small-diametered through-hole 11 is formed. Where the flange portion 2f is not made into an end surface, but the outer surface 2b of the nut is protruded therefrom by an amount corresponding to the width L of the seal 5, the formation of the counterbore 7 is unnecessary. Also, the number of turns of the balls is not limited to 2.5 turns. For example, it may also be 1.5 turns or 3.5 turns.

The assembly of the present embodiment will now be described. Description will be made of the right end side of the nut 2, it being understood that the assembly is effected in the same manner on the left end side.

The fixing of the seal 5R fitted to the seal mounting stepped portion 3R of the nut 2 is effected by the pin member 10R. That is, the seal 5R is axially fitted fully into the depth of the seal mounting stepped portion 3R with the aperture position mark 14 on the outer end surface 5a registered with the position of the through-hole 11R of the nut 2. Thereby, the through-hole 11R and the pin insertion aperture 13R are aligned and communicated with each other. In that state, the pin member 10R is radially inserted into the through-hole 11R from the tapered surface 10d at the tip end of the pin member. The pin member 10R, when inserted, is elastically deformed and is reduced in its diameter at the portion of the slot 10a and therefore, the protruded portion 10c can also easily pass through the through-hole 11R. The tip end portion of the pin member 10R is inserted into the pin insertion aperture 13R in the seal 5R, and soon the intermediate protruded portion 10c arrives at the escape groove 12R which is the engagement recess A, and comes into engagement with it. At the same time, the diameter of the pin member 10R is enlarged by the elastic force of restoration thereof, and as shown in FIG. 4, the pin barrel portion 10b is brought into pressure contact with the through-hole 11R and the pin insertion aperture 13R. Thus, the pin member 10R provides a slip preventing member for the seal 5R and fixes the seal 5R in the circumferential direction and the axial direction.

When the pin member 10R is to be removed or disengaged, a hook bar prepared in advance is inserted into the pin member 10R by the utilization of the slot 10a in the pin member 10R, and the tip end thereof is hooked on the pin member to thereby pull the hook bar radially outwardly. Thereupon, the protruded portion 10c of the pin member 10R which has so far been engaged with the escape groove 12R is pushed by the corner of the groove so that the diameter of the pin member 10R is elastically reduced and therefore, the pin member can be easily removed.

Assuming that the nut 2 is in its non-rotated state and is supported for axial movement, the balls B will roll in the opposed thread grooves 1a and 2a due to the rotation of the screw shaft 1 and the nut 2 rectilinearly moves in the forward direction or the backward direction (left or right as viewed in FIG. 1) in conformity with the direction of rotation of the screw shaft 1. The balls B will repeat endless circulation via the ball circulating tube (not shown) as long as the screw shaft 1 continues to rotate. During the movement of the nut 2, the seal 5R or 5L on the end portion of the movement direction side thereof will wipe off any foreign substances adhering to the outer surface of the screw shaft 1 to thereby prevent the entry of the foreign substances into the interior of the nut 2. Accordingly, no foreign substances will come into the interior of the nut 2 and the rolling and endless circulation of the balls B will take place very smoothly.

As regards the machining for the fixing of the seals 5R and 5L to the nut 2, only the formation of the corresponding one of through-holes 11R, 11L and engagement recess A is required for each seal. Moreover, the formation of the engagement recess A can be done simultaneously with the formation of the stepped portions 3R and 3L as the escape grooves 12R and 12L in the mating surfaces of the seal mounting stepped portions 3R and 3L, so that there is no significant additional burden in the production of the nut 2. Thus, a substantial reduction in the number of steps can be realized as compared with the fixing structure of the conventional set screw type.

The through-holes 11R and 11L in the nut 2 can be utilized as a reference during the turning and grinding of the threaded groove 2a of the nut 2. They can also be utilized as a reference during the formation of a tube hole in the case of a tube type nut. The number of the through-holes 11R, 11L is not limited to one per nut, but may also be plural.

Figure 5:
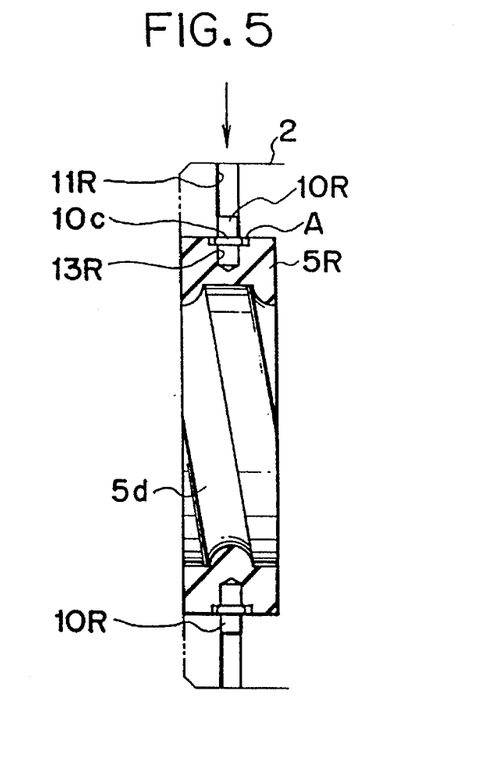
FIG. 5 is a longitudinal cross-sectional view of principal portions of another embodiment of the mounting member fixing structure of the present invention.
Figure 6:
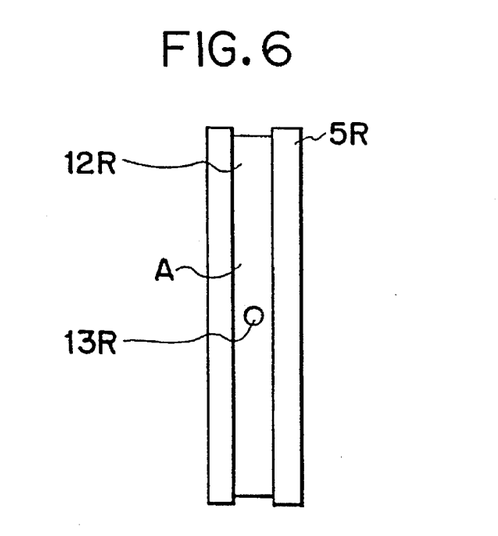
FIG. 6 is a front view of the mounting member of FIG. 5.

FIGS. 5 and 6 show another embodiment of the present invention.

This embodiment differs from the above-described first embodiment in that an escape groove 12 providing an engagement recess A engageable by the protruded portion 10c of the pin member 10R, 10L is formed in the outer peripheral surface 5b of the seal 5R, 5L. Thus, as regards the machining for the fixing of the seals to the nut 2, the formation of through-holes 11R and 11L alone will suffice, and the process of manufacture will become simpler.

Figure 7:
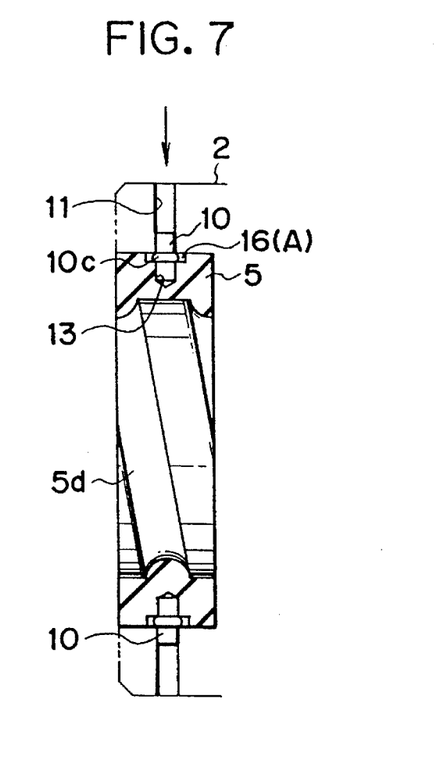
FIG. 7 is a longitudinal cross-sectional view of principal portions of another embodiment of the mounting member fixing structure of the present invention.
Figure 8:
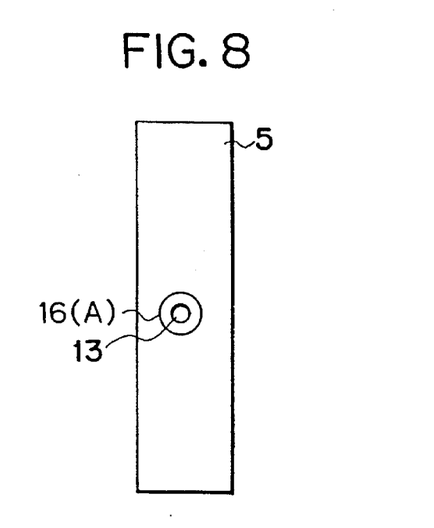
FIG. 8 is a front view of the mounting member of FIG. 7.

FIGS. 7 and 8 show still another embodiment of the present invention.

In this embodiment, as the engagement recess A engageable by the protruded portion 10c of the pin member 10, a counterbore 16 coaxial with the pin insertion aperture 13 is formed in the seal 5. Again in this case, as regards the machining for the fixing of the seals to the nut 2, the formation of through-holes 11 alone will suffice.

Figure 9:
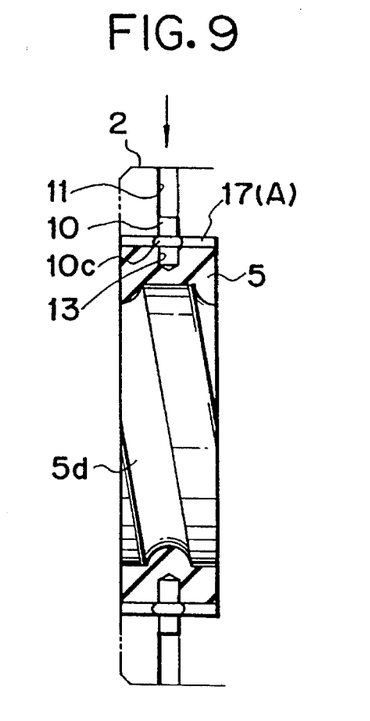
FIG. 9 is a longitudinal cross-sectional view of principal portions of another embodiment of the mounting member fixing structure of the present invention.
Figure 10:
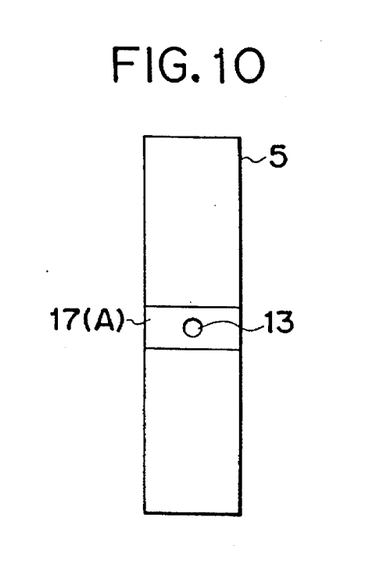
FIG. 10 is a front view of the mounting member of FIG. 9.

FIGS. 9 and 10 show yet still another embodiment of the present invention.

In this embodiment, to provide the engagement recess A engage able by the protruded portion 10c of the pin member 10, an axial groove 17 is formed at the position of the pin insertion aperture 13 in the outer peripheral surface 5b of the seal 5. Again in this case, as regards the machining for the fixing of the seals to the nut 2, the formation of through-holes 11 will suffice.

A modification of the pin member 10 will now be described.

Figure 11:
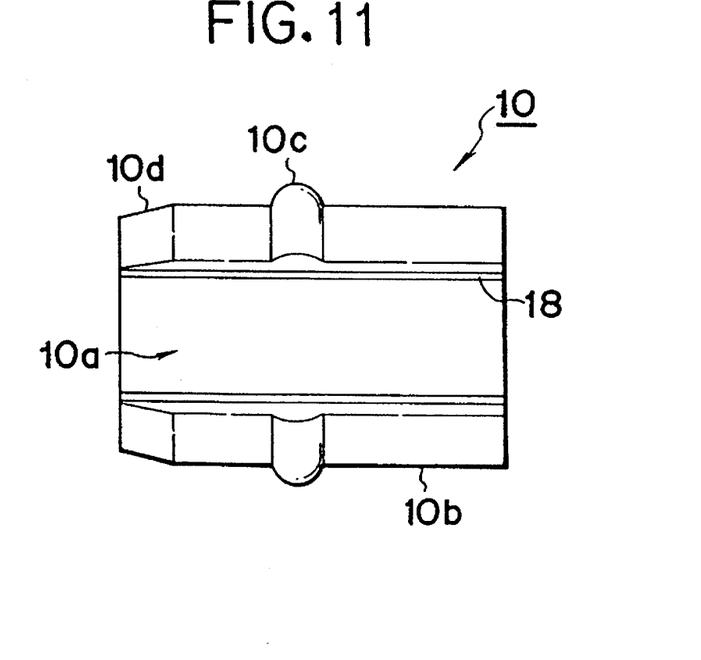
FIG. 11 is a front view of another embodiment of the pin member of the present invention.
Figure 12:
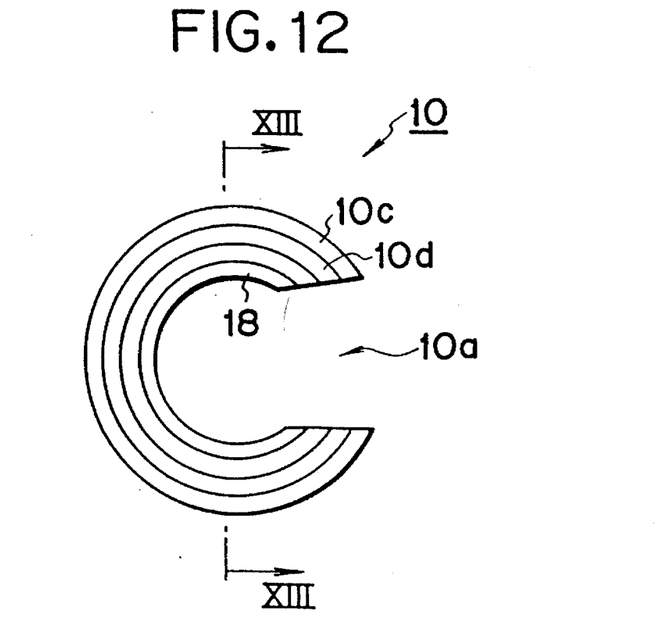
FIG. 12 is an end view of the pin member of FIG. 11.
Figure 13:
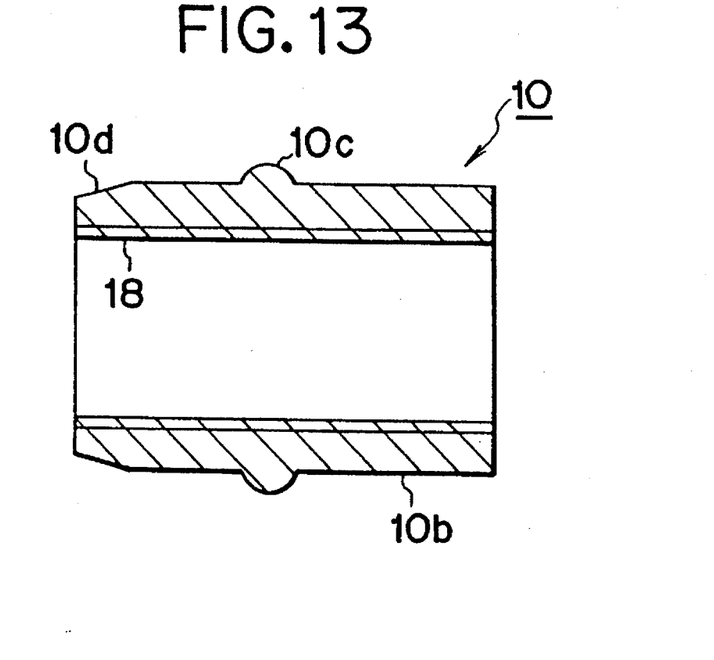
FIG. 13 is a cross-sectional view taken along the line XIII—XIII of FIG. 12.

The pin member 10 shown in FIGS. 11 and 12 is one formed by press-molding a steel material. It has a C-shape similar to that shown in FIGS. 2 and 3, but differs in that a female thread 18 is formed in the inner surface of the pin member. This pin member 10 is inserted into the through-hole 11 and the pin insertion aperture 13, and then a male screw of a stop pin is threadably engaged with the female thread 18 and is screwed to the protruded portion 10c. The protruded portion 10c of the pin member 10 can thus be prevented from being elastically deformed inwardly and reduced in diameter, whereby the pin member 10 can be prevented more reliably from slipping out. Also, if only the fore end portion of the male screw of a stop pin is threadably engaged with the rear end of the female thread 18, it will become easy to pull out the mounted pin member 10.

Figure 14:
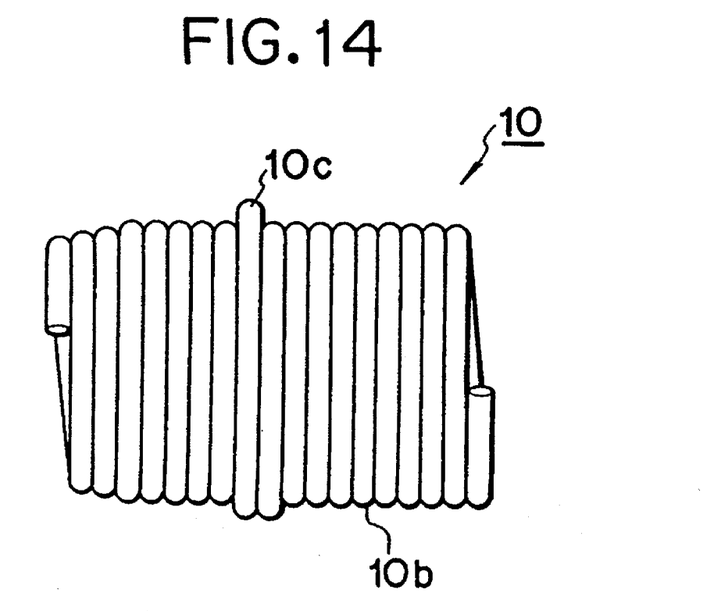
FIG. 14 is a front view of another embodiment of the pin member of the present invention.

The pin member 10 shown in FIG. 14 is one formed by winding a metal wire into the form of a coil spring. The protruded portion 10c of the pin member 10 is formed by increasing the diameter of turn by an amount corresponding to the thickness of the wire, and this pin member can be inserted and removed by the utilization of the elasticity of the spring.

The nut to which the present invention is applied is not restricted to a ball screw nut. For example, present invention is also suitably applicable to a nut threadably engaged with a popular screw, a trapezoidal screw or the like. Also, while the above embodiments have been described with respect only to a case where the dustproof seals are mounted as mounting members onto a nut, the principles of the invention are not restricted to a seal. Further, the mounting members need not always be mounted on the opposite end portions of the nut. A mounting member may be mounted only on one end portion of the nut, for example.

Also, in the illustrative embodiments of the escape groove formed in the inner surface 3a of the seal mounting stepped portion 3 of the nut, the escape groove formed in the outer peripheral surface of the seal, and the counterbore and the axial groove, are formed in the joint portion between the nut and the seal to facilitate implementation of the present invention. However, the engagement recess need not always be formed in the joint portion between the two members, and may otherwise be located at any position in the pin member receiving through-hole in the nut.

Also, in the above-described embodiments, there has been shown the position mark of the pin insertion aperture provided on the end surface of the seal which is the mounting member, but this mark is not strictly necessary, because even if it is omitted, it will be possible to register the pin insertion aperture with the through-hole formed in the nut.

The fixing structure for the mounting member of the nut according to the present invention makes the working of threads unnecessary, so that a substantial simplification of the process of machining to the nut becomes possible and productivity is improved remarkably. There is also obtained the effect that the fixing and removal of the mounting member can be readily accomplished simply by the insertion and removal of the pin member.

What is claimed is:

1. A fixing structure for a mounting member of a nut, comprising a screw shaft formed with a male thread on an outer peripheral surface thereof, a nut formed with a female thread on an inner peripheral surface thereof and formed with a stepped portion on the inner peripheral surface thereof at least at one end so as to provide a large-diametered portion, a mounting member for mounting on the stepped portion of said nut, and a pin member to position and fix said mounting member in a predetermined state on said nut, characterized in that said pin member is resiliently diametrically inwardly deformable and has a large-diametered axially intermediate portion and smaller diameter opposite axial end portions, said large-diametered portion of said nut has a radial through-hole to which one of said end portions of said pin member fits, said mounting member has a pin insertion aperture alignable with said through-hole and to which the other end portion of said pin member fits, and an engagement recess larger in diameter than said through-hole and said pin insertion aperture is formed in a mating surface between the large-diametered portion of said nut and said mounting member to receive the large-diametered intermediate portion of said pin, whereby when said mounting member is fitted to the stepped portion of said nut, and said through-hole and said pin insertion aperture are aligned with each other in the axial direction and the circumferential direction of said nut, said pin member can be inwardly deformed to reduce its diameter and inserted into said through-hole and said pin insertion aperture such that said large-diametered portion of said pin member is brought into engagement with said engagement recess and said opposite end portions of said pin member are resiliently pressed against said through-hole and said pin insertion aperture, thereby preventing slipping-out of said pin member to fix said mounting member on said nut.

2. The fixing structure of claim 1, wherein said engagement recess is formed in the inner peripheral surface of said stepped portion.

3. The fixing structure of claim 1, wherein said engagement recess is formed in the outer peripheral surface of said mounting member.

4. The fixing structure of claim 1, wherein said pin member is formed of a springy material and has a C-shaped cross-section.

5. The fixing structure of claim 4 wherein the inner surface of said pin member is formed with a female thread.

6. The fixing structure of claim 1, wherein said through-hole and said pin insertion aperture are of equal diameter.

7. The fixing structure of claim 6, wherein a tip portion of one of said end portions of said pin member is tapered inwardly toward an axial extremity of said tip portion.

* * * * *

UNITED STATES PATENT AND TRADEMARK OFFICE
CERTIFICATE OF CORRECTION

PATENT NO. : 5,555,771
DATED     : September 17, 1996
INVENTOR(S) : Daisuke KUROIWA, et al It is certified that error appears in the above-indentified patent and that said Letters Patent is hereby corrected as shown below:

On the Title Page, insert --[73] Assignee:   NSK Lts., Tokyo, Japan--

Signed and Sealed this

Fourteenth Day of October, 1997

*Attest:*

BRUCE LEHMAN

*Attesting Officer*          *Commissioner of Patents and Trademarks*

UNITED STATES PATENT AND TRADEMARK OFFICE
CERTIFICATE OF CORRECTION

PATENT NO. : 5,555,771
DATED : September 17, 1996
INVENTOR(S) : Kuroiwa, et al

It is certified that error appears in the above-identified patent and that said Letters Patent is hereby corrected as shown below:

On the title page, insert -- [73] Assignee: NSK Ltd., Tokyo, Japan --

This certificate supersedes Certificate of Correction issued October 14, 1997.

Signed and Sealed this

Ninth Day of June, 1998

Attest:

BRUCE LEHMAN

*Attesting Officer*    *Commissioner of Patents and Trademarks*